United States Patent
Boyer et al.

(10) Patent No.: US 8,621,761 B2
(45) Date of Patent: Jan. 7, 2014

(54) SELF IDENTIFYING TEMPLATE GAGE PROBING SYSTEM

(75) Inventors: Jesse R. Boyer, Manchester, CT (US); Robert E. Erickson, Storrs, CT (US); Christopher F. O'Neill, Hebron, CT (US); James Romanelli, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 203 days.

(21) Appl. No.: 13/341,583

(22) Filed: Dec. 30, 2011

(65) Prior Publication Data
US 2013/0167392 A1 Jul. 4, 2013

(51) Int. Cl.
*G01B 3/14* (2006.01)

(52) U.S. Cl.
USPC ................................ 33/552; 33/1 BB; 33/562

(58) Field of Classification Search
USPC .................. 33/1 BB, 551, 552, 553, 554, 562
See application file for complete search history.

(56) References Cited

U.S. PATENT DOCUMENTS

| | | | |
|---|---|---|---|
| 2,621,367 A * | 12/1952 | Kish | 33/562 |
| 5,185,996 A | 2/1993 | Smith et al. | |
| 7,024,787 B2 * | 4/2006 | Varsell et al. | 33/562 |
| 7,259,552 B2 | 8/2007 | Twerdochlib | |
| 7,458,768 B2 | 12/2008 | Dube et al. | |
| 2005/0217131 A1 * | 10/2005 | Varsell et al. | 33/562 |
| 2010/0054916 A1 | 3/2010 | Zheng et al. | |
| 2010/0064537 A1 * | 3/2010 | Petroskie et al. | 33/533 |

FOREIGN PATENT DOCUMENTS

WO    2011045343 A1    4/2011

* cited by examiner

*Primary Examiner* — G. Bradley Bennett
(74) *Attorney, Agent, or Firm* — Kinney & Lange, P.A.

(57) ABSTRACT

A component inspection system comprises a sensor apparatus and a template having a component side and an opposing inspection side. The inspection side includes a plurality of inspection bosses projecting therefrom, each of the plurality of inspection bosses having a first coupling and a sensor aperture. Each aperture is disposed axially through each respective boss to the component side of the template. The sensor apparatus includes a receptacle for retaining a sensor. The receptacle has a second coupling configured to individually engage with each of the plurality of first couplings for removably securing the sensor apparatus to a respective at least one of the plurality of inspection bosses.

20 Claims, 6 Drawing Sheets

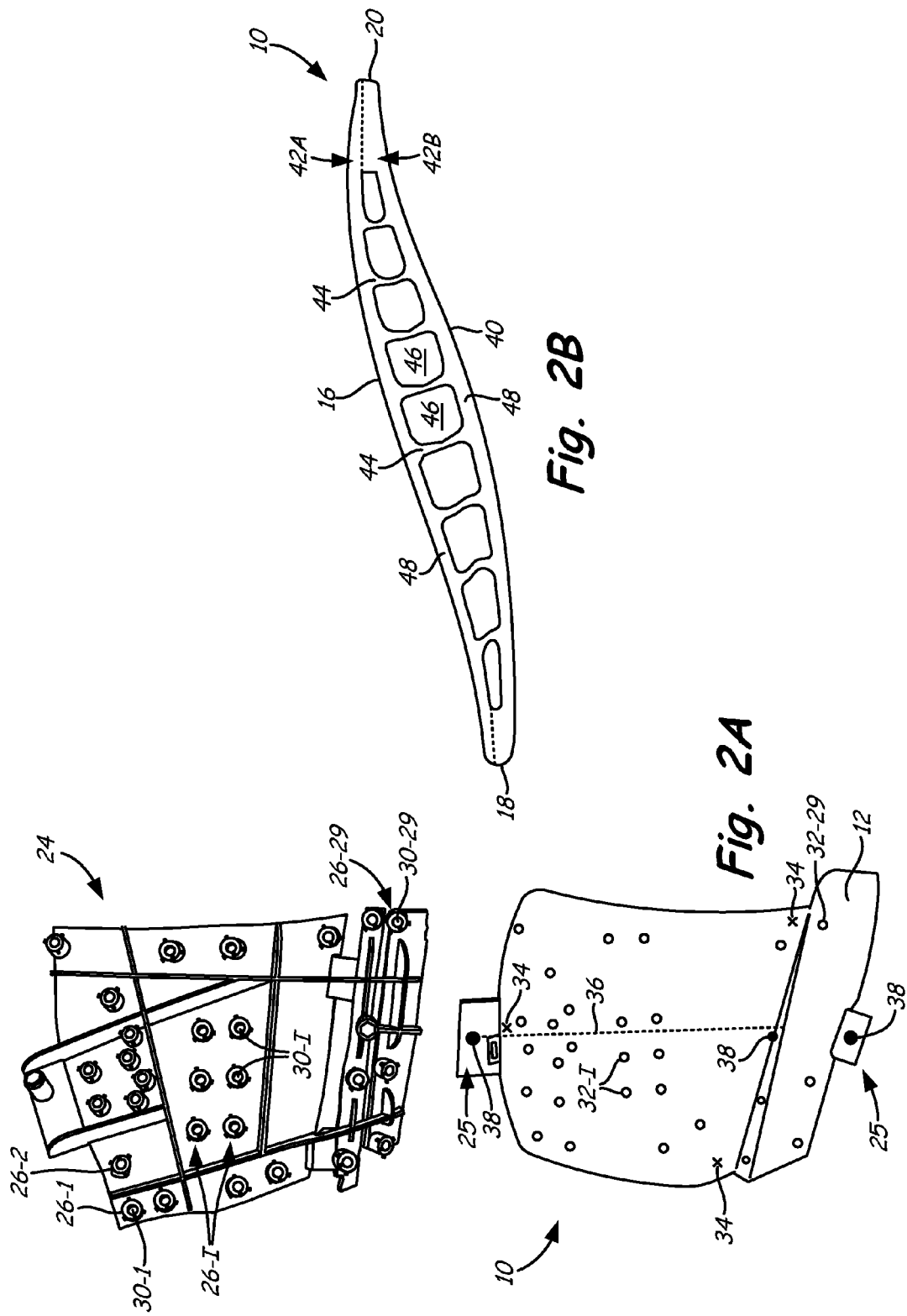

SELF IDENTIFYING TEMPLATE GAGE PROBING SYSTEM

BACKGROUND

The application relates generally to methods and apparatus for in-process form checks of manufactured components, and more specifically to checks of gas turbine airfoils.

Components, including those built to tight tolerances like airfoils, are repeatedly checked throughout the manufacturing process for conformance with such tolerances. For example, fan blades include several manufacturing stages such as casting or forging, quenching, rough machining, and final machining. Hollow fan blades include additional manufacturing steps depending on the chosen process for forming the internal features. Diffusion bonded hollow blades are formed in two pieces then joined around the edges. Both position and thickness of the blade surfaces must be measured often.

Tight tolerances often require expensive, high precision sensors which must consistently be placed correctly relative to the airfoil to reliably take correct measurements. The location of each measurement reading must also be correctly mapped to the corresponding airfoil reference point. Manual measurements using a single sensor without the aid of precise guidance can lead to significant opportunity for error both in position and location. One method of overcoming these shortcomings involves individual sensors fixed and integrated into a gauge at each and every reference point. However, such an arrangement is incredibly expensive, requiring the use of twenty or more sensors in order to take the simultaneous measurements.

SUMMARY

A component inspection system comprises a sensor apparatus and a template having a component side and an opposing inspection side. The inspection side includes a plurality of inspection bosses projecting therefrom, each of the plurality of inspection bosses having a first coupling and a sensor aperture. Each aperture is disposed axially through each respective boss to the component side of the template. The sensor apparatus includes a receptacle for retaining a sensor. The receptacle has a second coupling configured to individually engage with each of the plurality of first couplings for removably securing the sensor apparatus to a respective at least one of the plurality of inspection bosses.

An inspection template comprises a template body having a component side and an opposing inspection side. A plurality of inspection bosses project from the inspection side, each having a first coupling and a sensor aperture. Each aperture is disposed axially through each respective boss to the component side of the template.

A method of inspecting a component comprises aligning an inspection template with a component. An inspection side of the template has a plurality of inspection bosses projecting therefrom, and the plurality of inspection bosses includes a respective plurality of sensor apertures projecting axially therethrough. A sensor is coupled to one of the plurality of inspection bosses to align the sensor through the respective sensor aperture. The sensor is operated to record a localized inspection result.

BRIEF DESCRIPTION OF THE DRAWINGS

FIG. 2A is an isometric view of a gas turbine engine fan blade with an inspection template.

FIG. 2B is a cross-section of a hollow fan blade.

DETAILED DESCRIPTION

Figure 1:
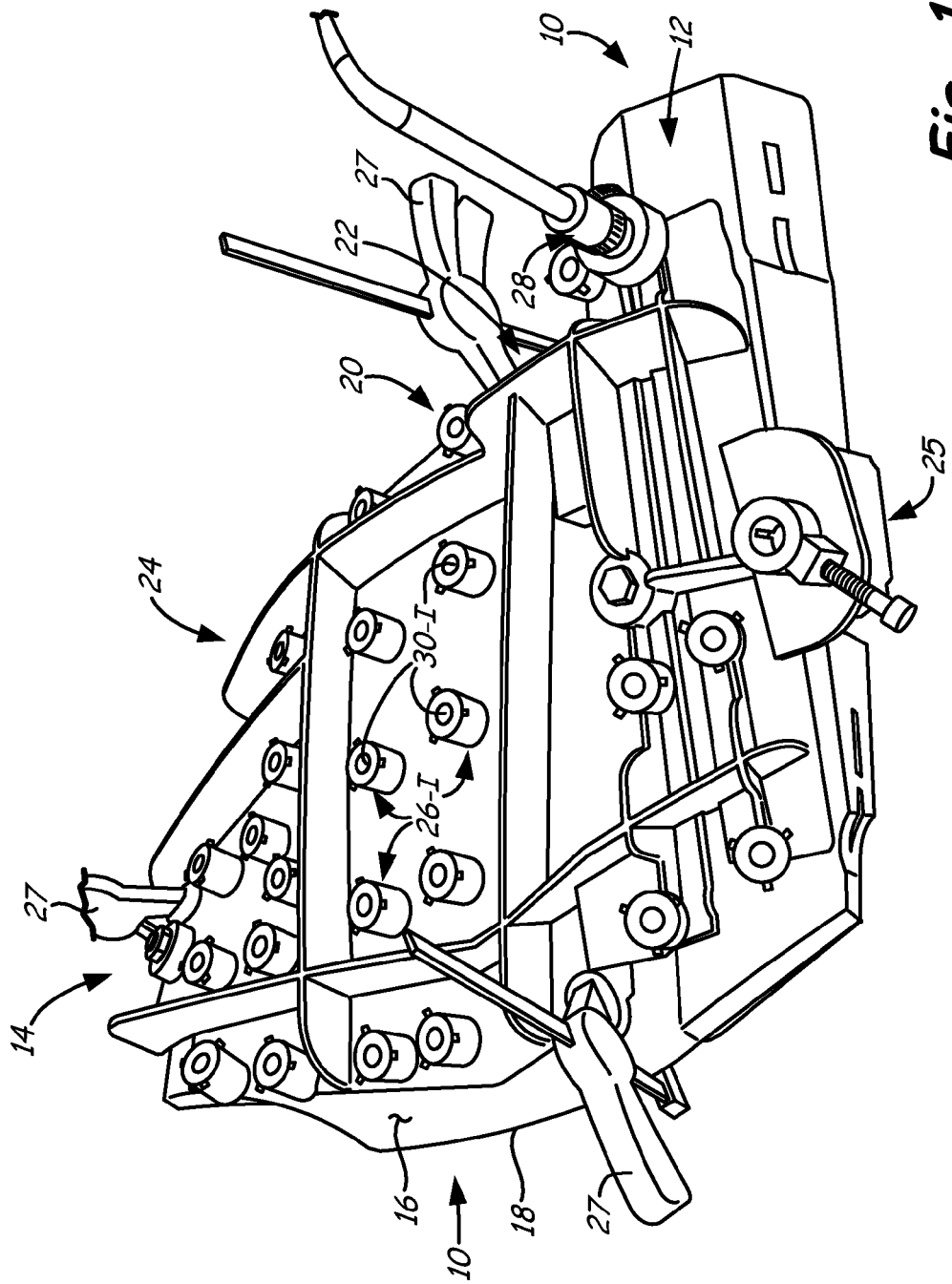
FIG. 1 schematically depicts a gas turbine engine fan blade with an inspection apparatus including an inspection template and a sensor apparatus.

FIG. 1 shows fan blade 10, root edge 12, tip region 14, suction surface 16, leading edge 18, trailing edge 20, airfoil inspection system 22, inspection template 24, sacrificial airfoil element 25, inspection bosses 26-I, clamps 27, sensor apparatus 28, and sensor apertures 30-I. Fan blade 10, which for example can be used in a turbofan gas turbine engine (not shown), includes root edge 12, tip region 14, suction surface 16, leading edge 18, and trailing edge 20. Fan blade 10 is joined at root edge 12 to a fan rotor (not shown) which generates thrust by using a plurality of circumferentially arranged blades 10 to push air through a bypass duct around the turbine power core (not shown). In this example, fan blade 10 is shown as a separate entity with root edge 12 removably securable to the rotor (not shown). However, fan blade 10 can alternatively be integrally formed with, or welded directly to the fan rotor.

Fan blade 10 can be checked at multiple stages throughout production. A reliable form check entails evaluating blade 10 at a plurality of reference points (shown in FIG. 2A) distributed around suction surface 16. One or more characteristics of blade 10 are checked against the ideal or nominal characteristics of the reference blade or the digital design model at each of the plurality of reference points shown in FIG. 2A. It will be understood that the blade pressure surface opposite suction surface 16 (shown in FIG. 2B) also can have a similar plurality of reference points and corresponding characteristics.

Potential nominal, ideal, and actual characteristics of blade 10 include surface position, thickness, surface contour angle, etc. An appropriate contact or non-contact sensor is thus positioned on or normal to each reference point to measure these or other characteristics of blade 10. Example sensors thus can include without limitation, a white light sensor, an ultrasonic sensor, a linear variable differential transformer (LVDT) sensor, a thermal acoustic sensor, and a coordinate measuring sensor.

Airfoil inspection system 22 includes sensor template 24 and sensor apparatus 28. Sensor template 24 can be secured to blade 10 such as by clamps 23. As will be seen later, template 24 generally conforms to blade 10 but is held a substantially uniform distance therefrom by various tooling or nesting features not visible in FIG. 1, some of which may be present on one or more sacrificial blade elements 25. Template 24 includes a plurality of inspection bosses 26-I for removably securing sensor apparatus 28 to template 24. In this example, I is a sequential nonzero integer value identifying each unique position of reference point 22. Each boss 26-I has a corresponding sensor aperture 30-I disposed axially therethrough, as well as a coupling portion for engaging a coupling disposed on sensor apparatus 28 (detailed in FIGS. 4A-4C). In this example, template 24 has a total of 29 apertures, but this number can vary depending on the number of blade reference points 32-I (shown in FIG. 2A).

When template 24 is aligned with blade 10 and when the sensor (not visible in FIG. 1) contained in apparatus 28 projects through sensor apertures 30-I, the sensor is correctly positioned relative to respective blade reference points located thereunder. As will be seen later, in this example, sensor apparatus 28 is removably secured to boss 26-29. Though not visible in FIG. 1, it will be described below that the operative end of the sensor thus projects through aperture 30-29 and is substantially normal to suction surface 16 at or above the corresponding reference point 32-29 (shown in FIG. 2A).

FIG. 2A shows fan blade 10, root edge 12, tip region 14, suction surface 16, leading edge 18, trailing edge 20, inspection template 24, sacrificial blade elements 25, inspection bosses 26-I, sensor apertures 30-I, blade reference points 32-I, blade nesting points 34, neutral line 36, and recesses 38.

FIG. 2A depicts an exploded view of FIG. 1, with template 24 disposed above suction surface 16 of fan blade 10. Template 24 includes a plurality of inspection bosses 26-I to sequentially position sensor apparatus 28 on or substantially normal to each respective blade reference point 32-I, ensuring correct measurements and minimizing tolerance stacking. Template 24 is aligned relative to blade 10 at blade nesting points 34 and blade neutral line 36 delineated by two conical recesses 38. Neutral line 36 passes through the aerodynamic center of blade 10. One recess 38 is disposed on sacrificial blade portion 25 proximate tip region 14, while a second recess 38 is disposed on the interface between suction surface 16 and root edge 12. A third recess is on sacrificial portion 25 adjacent root edge 12. Sacrificial elements 25 are provided during manufacturing for various purposes, including for holding blade 10 in a chuck for machining or for other processing. Inspection template 24 includes corresponding nesting features shown in FIGS. 3A and 3B.

As shown in more detail below, sensor apparatus 28 includes a sensor retained in a receptacle. The receptacle individually and sequentially removably engages with the plurality of inspection bosses 26-I to retain the sensor through the corresponding apertures 30-I. As noted above, each boss 26-I is aligned with and corresponds to the location of respective blade reference points 32-I, and can be centered with respective apertures 30-I substantially normal thereto. In certain embodiments described in detail below, inspection template 24 and sensor apparatus 28 can be configured to include interacting features such as a tab and resistor, whereby a circuit is closed and a sensor reading is recorded only when sensor apparatus 28 is properly placed in the boss 26-I. As further described below, the resistor can optionally be configured to have a unique ohm value corresponding to the relative location of each individual boss, allowing a controller or other analyzing device to automatically correlate and register the location of each sensor on or normal to a given blade reference point 32-I. Thus a single sensor apparatus 28 can be used for form checks occurring throughout production of blade 10 or its precursors. Form checks performed during production not only identifies parts falling outside acceptable tolerances, checking each blade throughout production can alert workers when tooling for casting or forging (not shown) should be replaced.

When used without additional aids, the sensor must be manually positioned correctly and the reading for each reference point 32-I must be taken and registered by the user only upon the sensor orientation falling within an acceptable measurement tolerance. Thus substantial risk of human error is likely when positioning the sensor without additional guidance. But since inspection template 24 enables use of as few as one movable sensor, the need is avoided to procure, fix, and connect twenty or more individual sensors to a gauge and corresponding controller. Using a large number of sensors can be prohibitively expensive and complex, particularly for repeated in-process form checks where several such gauges are used at different stages of the manufacturing process. For example, when using a gauge with fixed sensors, checking an airfoil at twenty reference points after each of three production stages can require up to sixty different sensors for the three different in-process gauges. In contrast, the present arrangement facilitates the use of as few as one sensor, which is removably secured to individual templates each of which represents the nominal result of each production stage. The sixty sensor requirement can double, triple, or more if multiple types of sensors are required to measure multiple characteristics of the in-process airfoil.

FIG. 2B shows blade 10, suction surface 16, leading edge 18, trailing edge 20, pressure surface 40, first blade precursor 42A, second blade precursor 42B, ribs 44, cavities 46, and surface thicknesses 48. FIG. 2B is a cross-section of an example hollow fan blade 10 taken across line 1B in FIG. 2A. In this example, hollow fan blade 10 is formed from two separate blade precursors 42A, 42B, representing respective pressure surface 40 and opposing suction surface 16. Precursors 42A, 42B are individually formed and upon passing one or more form checks are then diffusion bonded around their perimeters (i.e., around root edge 12, tip edge 14, leading edge 18, and trailing edge 20 shown in FIGS. 2A and 2B). Precursors 42A, 42B may be cast, forged, and/or machined from blanks prior to diffusion bonding and can be form checked after initial forming, before and after bonding, after quenching, and after processing.

Blade 10 also includes ribs 44, cavities 46, and surface thicknesses 48. Ribs 44 support suction surface 16 and pressure surface 40, defining cavities 46 to reduce the weight of blade 10, increasing its efficiency. Ribs 44 can be either integral to one or both precursors 42A, 42B, or can alternatively be bonded separately thereto. Positions and depths of cavities 46 and of surface thicknesses 48 can be measured and compared to nominal or ideal values. These nominal or ideal values have been determined as part of the design with respect to each reference points 32-I (shown in FIG. 2A). In other alternative examples, fan blade 10 is solid and would thus not need to be checked at quite as many stages or for as many characteristics. In either case, suction surface 16 and pressure surface 40 are typically checked at least after initial forming (e.g. casting or forging), and after subsequent processing (e.g. machining, twisting, etc.).

Figure 3A:
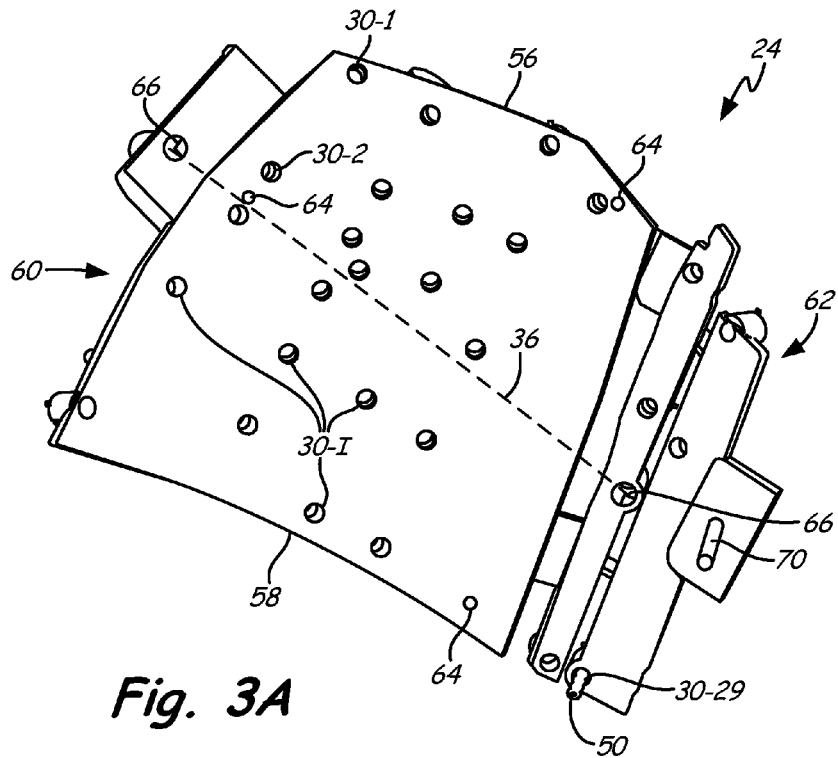
FIG. 3A shows a component side of an inspection template with a plurality of inspection aperture exit points.
Figure 3B:
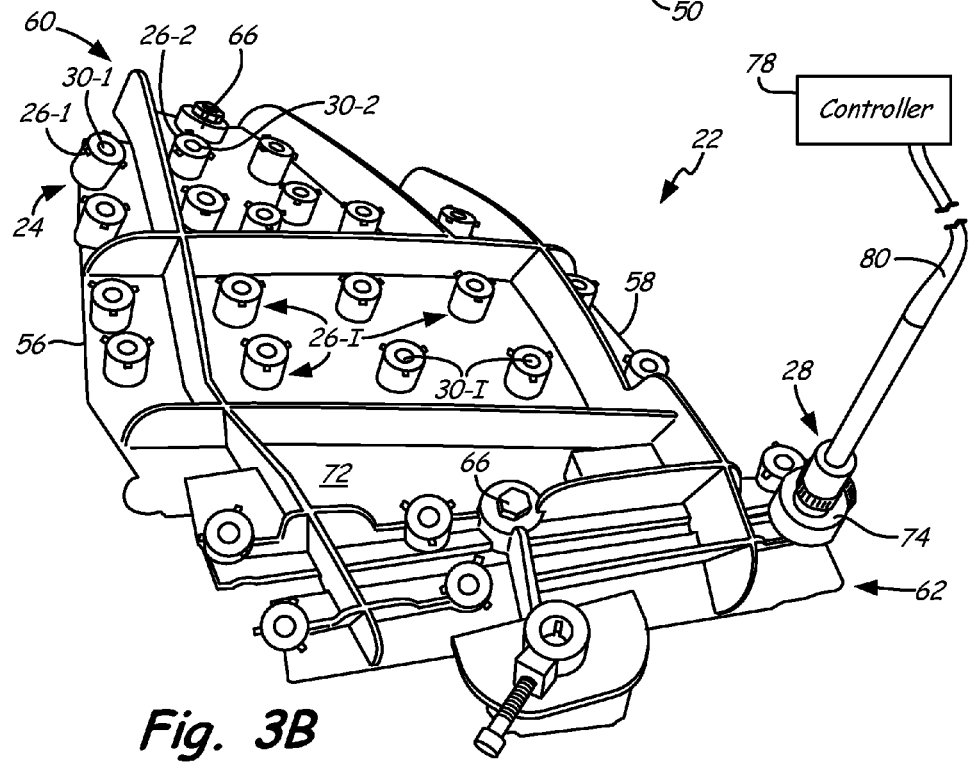
FIG. 3B shows an inspection side of the template with a plurality of inspection bosses and first couplings disposed thereon.

FIG. 3A shows inspection template 24, sensor apertures 30-I, sensor 50, template body 52, component side 54, template leading edge 56, template trailing edge 58, template tip region 60, template root region 62, tooling balls 64, plungers 66, and locating pin 70. Inspection template 24 includes sensor 50 projecting therethrough. Template 24 has body 52 with component side 54. For reference, template body 52 also has template leading edge 56, template trailing edge 58, template tip region 60, and template root region 62. FIG. 3B shows the inspection side opposite component side 54.

Sensor 50 projects through one of a plurality of sensor apertures 30-I. In this example, it is aperture 30-29, consistent with the view in FIG. 1. Proper alignment of template 24 locates apertures 30-I substantially equidistant and normal to the surface being inspected. Therefore an operative portion of sensor 50 projects through one or the plurality of apertures 30-I when correctly engaged to respective boss 26-I (shown in FIG. 3B). Sensor 50 is thus positioned on or directly above blade reference point 32-I (shown in FIG. 2A) to a high degree of precision. Sensor 50 can be either a contact or non-contact sensor used to measure one or more characteristics of blade 10. Example nominal, ideal, and actual characteristics of blade 10 include without limitation surface location (coordinates), thickness, and contour angle. Appropriate sensors are positioned as close as possible to each reference point 32-I to measure these or other characteristics of blade 10. Example sensors 50 thus can include without limitation, a white light sensor, an ultrasonic sensor, a linear variable differential transformer (LVDT) sensor, a thermal acoustic sensor, and a coordinate measuring sensor.

Gauges and templates typically are aligned visually with the component to be inspected, but such gauges are prone to parallax error. Here, parallax error is eliminated by providing a nest based on datums used throughout the manufacturing process, which map the surfaces of blade 10 relative to a zero- or neutral-point located at the blade center. While template 24 generally conforms to the surface of blade 10, template 24 can additionally be aligned with blade 10 (shown in FIG. 2A) using a five- or six-point nest consisting of alignment protuberances. In this example, protuberances include tooling balls 64 (disposed around the perimeter of component side 54) and plungers 66 (arranged along neutral line 36) define a five-point nest on component side 54. Tooling balls 64 align with nesting points 34 (shown in FIG. 2A), while plungers 66 can include a retractor or similar structure to resiliently engage with conical recesses 38. Recesses 38 can be formed on sacrificial portions 25, shown in FIG. 2A and removed after final machining of blade 10. Tooling balls 64 and plungers 66 maintain component side 54 at a substantially uniform distance normal to the surface of fan blade 10. Locating pin 70 optionally corresponds to third recess 38 on sacrificial portion 25. In certain embodiments, pin 70 can thus serve as a sixth nest point.

FIG. 3B includes airfoil inspection system 22, template 24, inspection bosses 26-I, sensor apparatus 28, sensor apertures 30-I, template leading edge 56, template trailing edge 58, template tip region 60, template root region 62, plungers 66, template inspection side 72, sensor receptacle 74, controller 78, and communication cable 80.

As noted above, includes template 24 with sensor apparatus 28. In this example, sensor apparatus 28 includes sensor 48 (not visible in FIG. 3B) retained within receptacle 76. Here sensor apparatus 28 is removably secured to inspection side 76 of template 24 proximate the intersection of template tip region 60 and template leading edge 56. Inspection side 72 has a plurality of inspection bosses 26-I projecting perpendicularly therefrom, positioning sensor apparatus 74 and thus sensor 44 (shown in FIG. 3A) on or normal to a corresponding blade reference point 22-I (shown in FIG. 2A).

Figure 4A:
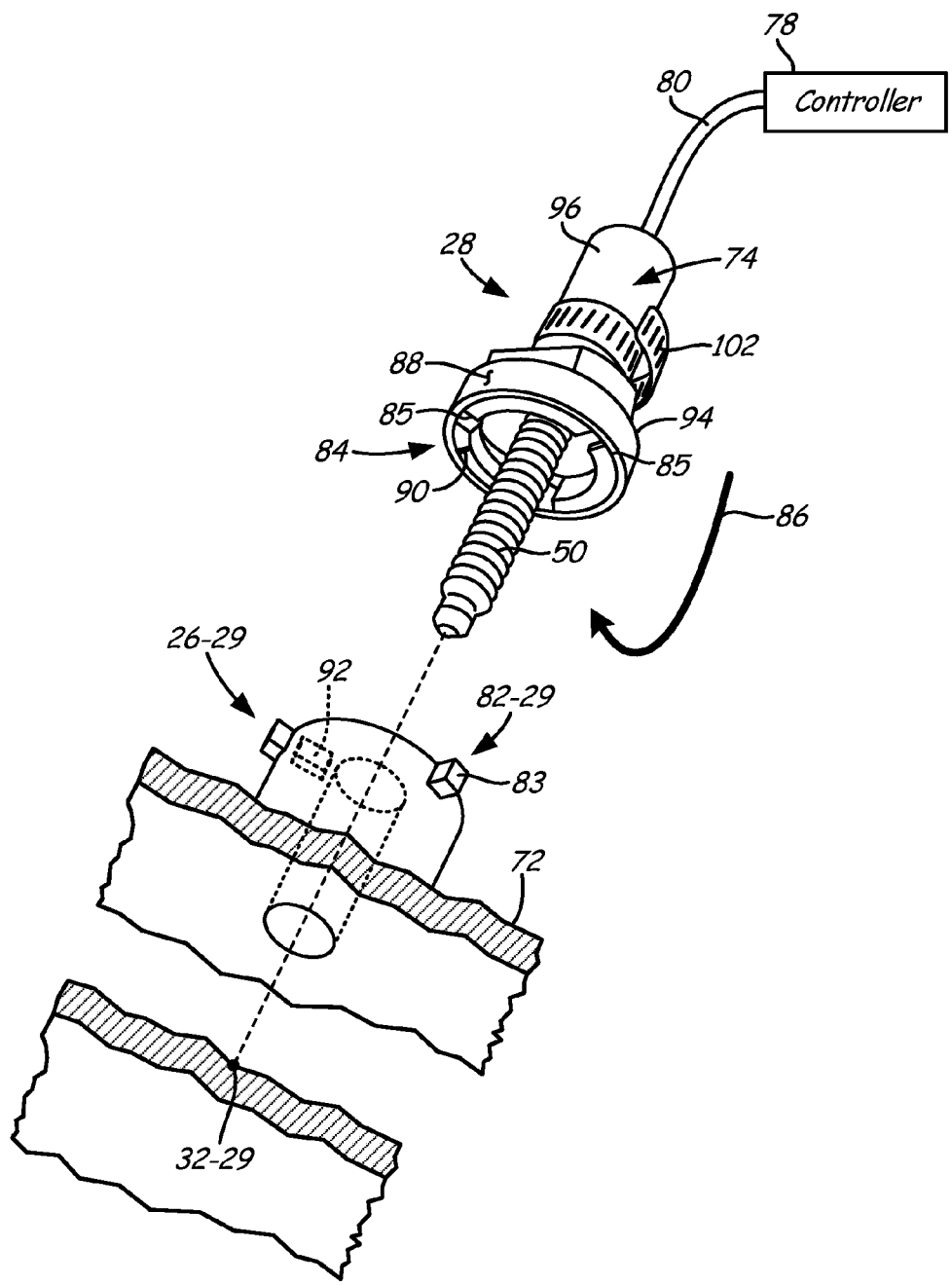
FIG. 4A depicts a sensor apparatus being coupled to an inspection boss.
Figure 4B:
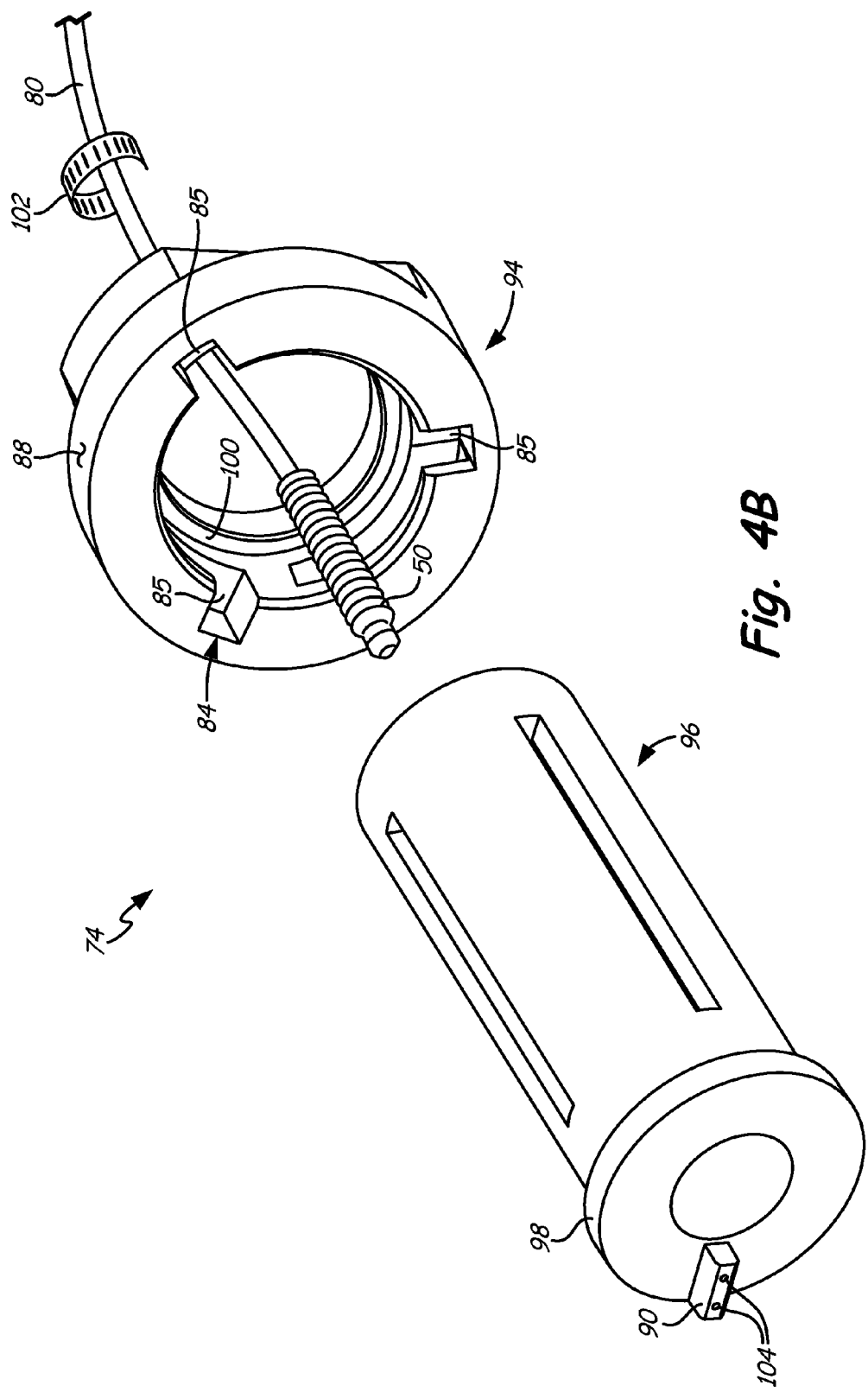
FIG. 4B is an exploded view of the sensor apparatus from FIG. 4A.

FIG. 4A is a detailed view of FIG. 1 proximate boss 26-29, showing sensor apparatus 28 being removably secured to inspection boss 26-29. FIG. 4B is an exploded view of sensor apparatus 28. FIGS. 4A and 4B include fan blade 10, blade reference point 22-29, inspection boss 26-29, sensor apparatus 28, sensor aperture 30-29, sensor 50, template inspection side 72, sensor receptacle 74, controller 78, communication cable 80, first coupling 82-29, coupling projections 83, second coupling 84, coupling slots 85, coupling direction 86, receptacle outer surface 88, tab 90, boss recess 92, cap 94, collar 96, flange 98, lip 100, retaining band 102, and metal contacts 104.

First coupling 82-29 is disposed around the perimeter of boss 26-29, while sensor apparatus 74 includes second coupling 84, which engages with first coupling 82-29, allowing sensor apparatus 28 to be removably secured to boss-26-29. Inspection boss 26-29 includes sensor aperture 30-29 disposed therethrough, providing access for sensor 50 to reach through to airfoil reference point 22-29.

To facilitate use of as few as one sensor 50, all inspection bosses 26-I (shown in FIGS. 1A, 2A, and 3B), in certain embodiments can be configured with identical first couplings 82-I such that they each are capable of being engaged with second coupling 84 disposed on sensor receptacle 74. Each first coupling 82-I and second coupling 84 can be interlocking portions of any suitable standard or quick connect coupling. Standard couplings are typically of the threaded type, such that one of coupling 82, 84 includes a threaded inner portion mating with a threaded outer portion on the other of couplings 82, 84. Quick connect couplings can be of the twist on or spring loaded type where resilient elements are substituted for the mating threads. Here, first couplings 82-I constitute the male end with coupling features disposed around the outer diameter, while second coupling 84 has coupling features disposed on its inner diameter. As seen in FIG. 4B, first couplings 82 include three outer projections 83 while second coupling 84 includes a corresponding three L-shaped slots 85.

Returning to FIG. 4A, first coupling 82-29 is engaged and locked to second coupling 84 when sensor apparatus 28 is pushed down and rotated in the manner shown by arrow 86, Upon turning sensor apparatus 28 approximately a quarter-turn, couplings 82-29 and 84 secure sensor apparatus 28 to boss 26-29. Sensor receptacle 74 can also include at least one knurled outer surface 88 to improve grip and further facilitate rapid engagement and disengagement of apparatus 74 to bosses 26.

Using substantially identical first couplings 82-I on each respective boss 26-I allows sensor 50 to be reliably positioned individually and sequentially to each boss 26-I. Thus this inspection arrangement requires as few as one sensor 50 to inspect the entire surface of the component, or one more of its precursors, while simultaneously reliably mapping the localized inspection results without human intervention. To ensure quality measurements, previous inspection gauges require that a large plurality of sensors be positioned and/or activated simultaneously at the reference points. Without a gauge, there was no way to reliably identify correct positioning of a single sensor absent the use of several simultaneously positioned sensors.

Figure 4C:
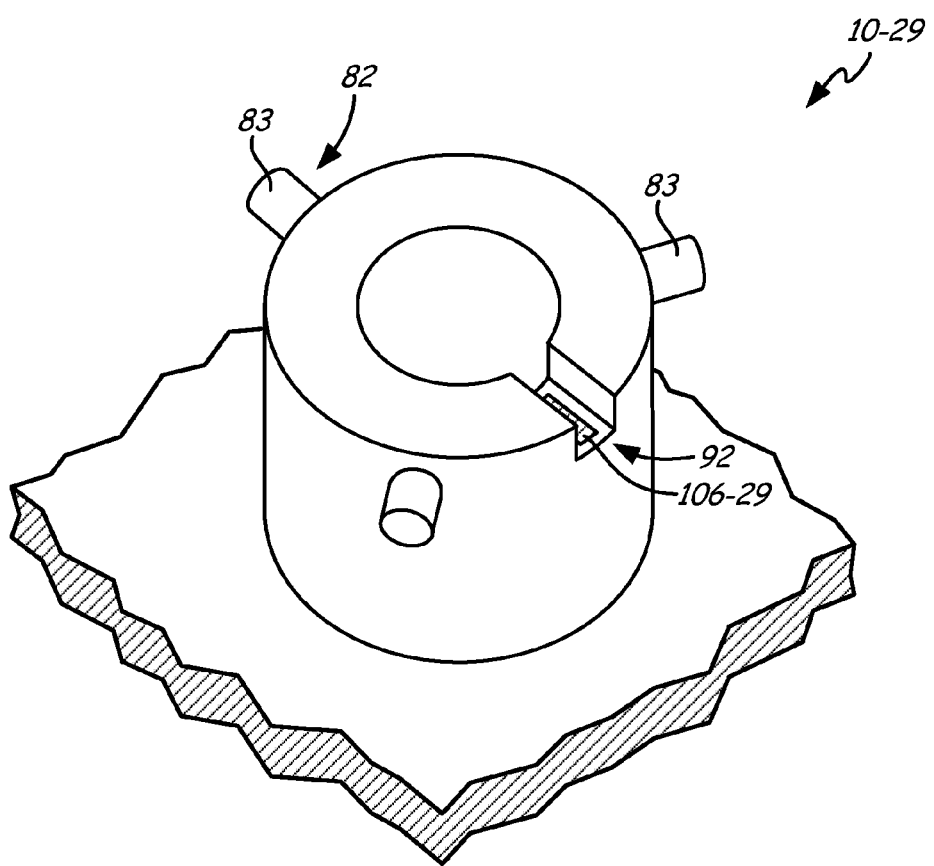
FIG. 4C is a cross-section of the inspection boss from FIG. 4A.

In this example, however, inspection system 22 includes a sensor activation circuit, which can be configured to take one or more readings from sensor 50 automatically upon correct positioning of sensor apparatus 28. In certain embodiments, the sensor activation circuit includes at least sensor apparatus 28 along with controller 78 and communication cable 80. In these embodiments, controller 78 is programmed to record at least one measurement from sensor 50 (shown in FIG. 4A) communicated via cable 80 only when properly positioned in a selected boss 26-I, here boss 26-29. In certain of those embodiments, controller 78 also automatically registers the position of sensor apparatus 28 (and thus sensor 50) upon recording the at least one measurement. Controller 78 is then programmed to map the recorded measurement data to the corresponding reference point 32-29. Controller 78 can be signaled in any suitable manner that sensor 50 is correctly positioned, thus triggering the programming directing controller 78 to record the at least one measurement. In one example, controller 78 can be signaled via a tab and resistor arrangement that is triggered upon engaging of first coupling 82-29 to second coupling 84. In this example, tab 90 is disposed on sensor receptacle 74. Tab 90 is configured to remain engaged to a corresponding structure disposed on boss 26-29, such as recess 92, so long as sensor apparatus 28 remains secured to boss 26-29. When sensor apparatus 28 is pushed down onto boss 26-29 (or any other boss 264), tab 90 engages recess 92 and remains as such after apparatus 28 is rotated in the manner shown by arrow 86. This indicates correct positioning and retaining of sensor 50 on or above blade reference point 32-29 (or other corresponding reference point 32-I). Upon correct engagement, the sensor activation circuit is then closed, which is sensed by controller 78 (via cable 80). After a designated time period to ensure full engagement and correct positioning of sensor 50, controller 78 then records at least one correct reading from sensor 50. FIG. 4C shows one example of a resistor disposed in or around one or more surfaces of recess 92.

As discussed above, sensor 50 can be a contact sensor or non-contact sensor with the choice determined by the characteristic(s) being measured. Contact sensors operate by contacting the surface being inspected, while non-contact sensors operate in proximity to the surface being inspected and operate using EMF, ultrasonic, or other emissions reflected back to the sensor. Sensor 50 communicates via wired connection 80 to controller 78, which may convert, aggregate, and/or analyze the sensor readings into usable information. It will also be recognized that in an alternative embodiment, sensor 44 can communicate wirelessly with controller 78 via a variety of protocols, in which cable 80 is replaced by suitable receivers, transmitters, and/or wireless signals such as radio frequencies, as well as other short- or long-range wireless communication technology.

FIG. 4B is an exploded view of sensor apparatus 28 with sensor 50 and receptacle 74. Receptacle 74 includes collar 96 axially disposed through an inner diameter of cap 94. Collar 96 also has flange end 98 for mating with lip 100 disposed around the inner diameter of cap 94. Sensor 44 can be secured to cap 94 and collar 96 with adjustable band 102, or other suitable apparatus.

In this example, second coupling 84 has three quick coupling slots 85 arranged such that they engage projections 85 defining first coupling 82-I (as shown in FIG. 4A). L-shaped slots 85 are disposed around an inner diameter portion of cap 94. Upon engagement, tab 90 is thus held in place against recess 92 (shown in FIGS. 4A and 4C), ensuring that sensor 50 is positioned correctly as described above and triggering the sensor activation circuit. To facilitate this, tab 90 can also include metal contacts 104 electrically connected to sensor 50 and/or controller 78 via connection to cable 80 (shown in FIG. 4A). Contacts 104 serve to close the sensor activation circuit upon contact with the resistor shown in FIG. 4C. As described above with respect to FIG. 4A, this can signal controller 78 (via cable 80) to record one or more sensor 50 readings and to optionally register the location of receptacle 74.

FIG. 4C shows boss 26-29, first coupling 82-29, coupling projections 83, recess 92, and resistor 106-29. FIG. 4C is a detailed view of one of the plurality of inspection bosses 26. First coupling 82-29, like other first couplings 82-I, includes three quick coupling tabs 83 disposed around the periphery of boss 26-I for engaging quick coupling slots 85 (shown in FIG. 4B). Resistor 106-29 is an electrically conductive element disposed on an inner surface of recess 92 proximate first coupling 82-29. As described above, in certain embodiments, resistor 106-29 can be recognized by controller 78 (shown in FIG. 4A), which is programmed to then record one or more sensor readings.

In a further embodiment, the plurality of inspection bosses 26-I (shown in FIG. 3B), can each include resistor 106-I, with each resistor having a specific and unique resistance value corresponding to the particular location of each boss 26-I. Controller 78 can then be programmed to recognize this individual resistance value and correlate it to the particular reference point 32-I (shown in FIG. 2A) at or above which sensor 50 is positioned. For example resistor 106-1 may have a 10 milliohm (mohm) resistor, resistor 106-2 may have a 20 mohm resistor, and so on. In this example, resistor 106-29 would have a 290 mohm resistor. In addition to notifying controller 78 that sensor 50 is in position for a correct reading, it also allows controller 78 to automatically map and register location information of sensor 50. This improves measurement reliability as well as reducing user error in recording and mapping sensor readings.

While described with reference to a single sensor, the example apparatus described above can be used simultaneously with more than one sensor and corresponding sensor receptacles. For example, two different types of sensors such as an LVDT sensor and an ultrasonic sensor may be used to simultaneously measure surface position and thickness respectively. Of course it will be recognized that the two sensors are not positioned on or above the same reference point at the same time. However, the two sensors can be removably secured to different bosses at the same time in order to measure the different characteristics using the same template. Similarly, two of the same type of sensors may be used simultaneously in different positions on the template to either expedite measurement of a single characteristic or to check the precision of one or the other sensor.

Various embodiments of the apparatus described above can be used in numerous inspection scenarios. In one example scenario, an inspection template having a plurality of inspection bosses can be used in conjunction with a single sensor to inspect a component or a precursor thereof. The inspection template is aligned with the airfoil on a component side such that the inspection side of the template faces away from the component surface. The single sensor is coupled to at least one of the plurality of inspection bosses, aligning the sensor at or normal to a reference point on the component through a sensor aperture disposed through the inspection boss. Alignment of the template with the component can optionally be facilitated with one or more nesting features. The sensor can be retained as part of a sensor apparatus comprising the sensor and a receptacle.

Upon correct alignment of the sensor with the component reference point, the sensor is then operated to take one or more readings defining a localized inspection result. The localized inspection result can be compared with a reference value corresponding to nominal or ideal values at the component reference point. A localized deviation value can be derived by comparing the localized result and reference value. These values and results relate to various characteristics of the component to be inspected and can include without limitation coordinates, surface thickness, contour angle, and others.

In certain embodiments, the coupling, operating, and comparing steps can be iteratively performed at a plurality of inspection bosses to derive a plurality of localized deviation values for a corresponding plurality of component reference points. In certain of those embodiments, an overall deviation value can be derived from the plurality of localized deviation values. The overall deviation value may correspond to deviation of at least a portion of the component being inspected. The localized and/or overall deviation values can be compared to corresponding localized and/or overall tolerance values to determine whether the component or its precursor has acceptable characteristics. Localized and overall values can be determined by a controller or analyzer communicating with the sensor.

As described above, the inspection system can be configured to automatically activate the sensor only when correctly positioned relative to a blade reference point. This can be done for example by providing a sensor activation circuit that activates the sensor only upon removably securing the sensor apparatus to one of the plurality of inspection bosses. Each inspection boss may have a first coupling identical to first couplings on each of the plurality of inspection bosses, with the first coupling configured to operate with the second coupling disposed on the sensor apparatus. The couplings can be any suitable variation on a standard or quick connect coupling as described above. The method can also utilize a self-registration system as part of the sensor activation circuit so as to minimize errors in measurement and in correlating the localized inspection values with a particular reference point on the component.

It will be recognized that the above method and apparatus were described using the illustrative example of a fan blade of a gas turbine engine. However, the method and apparatus can be readily adapted to inspection of other manufactured components, including other airfoil components, as well as to manufacturing precursors thereof. The method and apparatus can also be readily adapted to in-process and post-process form checks of other manufactured components.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A component inspection system comprising:
  a template with a component side and an opposing inspection side, the inspection side including a plurality of inspection bosses projecting therefrom, each of the plurality of inspection bosses having a first coupling and a sensor aperture, each aperture disposed axially through each respective inspection boss to the component side of the template; and
  a sensor apparatus including a receptacle for retaining a sensor, the receptacle having a second coupling configured to individually engage with at least one of the plurality of first couplings for removably securing the sensor apparatus to a respective at least one of the plurality of inspection bosses.

2. The system of claim 1, wherein the sensor apparatus also includes a sensor retained in the sensor receptacle.

3. The system of claim 2, wherein the sensor is selected from the group of: a white light sensor, an ultrasonic sensor, a linear variable differential transformer sensor, a thermal acoustic sensor, a coordinate measuring sensor, and a computed tomography sensor.

4. The system of claim 2, further comprising a controller programmed to record at least one reading from the sensor upon securing the sensor apparatus to one of the plurality of inspection bosses.

5. The system of claim 4, wherein, with the sensor apparatus secured to one of the plurality of inspection bosses, an operative end of the sensor projects through the sensor aperture correctly positioned to record the at least one reading.

6. The system of claim 4, wherein the controller is programmed to map a relative position of the sensor receptacle based on reading a resistance value of a resistor, the resistance value corresponding to a relative position of the one of the plurality of inspection bosses.

7. The system of claim 1, wherein the first and second couplings are interlocking portions of a quick connect coupling.

8. The system of claim 1, wherein the sensor receptacle includes a sensor collar axially disposed through an inner diameter of a cap, the collar having a flange end mating with a lip disposed on the inner diameter of the cap.

9. The system of claim 8, wherein the cap includes a knurled outer surface.

10. The system of claim 1, wherein the component to be inspected is a fan blade for a gas turbine engine, or a precursor thereof.

11. An inspection template comprising:
  a template body having a component side and an opposing inspection side; and
  a plurality of inspection bosses projecting therefrom, each of the plurality of inspection bosses having a first coupling and a sensor aperture, each aperture disposed axially through each respective boss to the component side of the template.

12. The template of claim 11, wherein the component side of the template has a shape substantially identical to a shape of a surface of a component to be inspected.

13. The template of claim 11, wherein the component side of the template includes an alignment nest having at least five alignment protuberances.

14. The template of claim 11, wherein the component to be inspected is an airfoil for a gas turbine engine, or a precursor thereof.

15. The template of claim 11, further comprising a plurality of resistors disposed proximate a surface of each of the respective plurality of inspection bosses.

16. The template of claim 15, wherein each of the plurality of resistors has a resistance value corresponding to a relative position of each of the respective plurality of inspection bosses.

17. A method of inspecting a component, the method comprising:
  aligning an inspection template with a component, an inspection side of the template having a plurality of inspection bosses projecting therefrom, the plurality of inspection bosses including a respective plurality of sensor apertures projecting axially therethrough;
  coupling a sensor to one of the plurality of inspection bosses to align the sensor through the respective sensor aperture; and
  operating the sensor to record a localized inspection result.

18. The method of claim 17, further comprising:
  comparing the recorded localized inspection result with a reference value to derive a localized deviation value.

19. The method of claim 18, further comprising:
  iteratively performing the coupling, operating, and comparing steps a plurality of times to derive a corresponding plurality of localized deviation values.

20. The method of claim 18, further comprising:
  comparing the localized deviation value to a localized tolerance value.

* * * * *

UNITED STATES PATENT AND TRADEMARK OFFICE
CERTIFICATE OF CORRECTION

| | | Page 1 of 1 |
|---|---|---|
| PATENT NO. | : 8,621,761 B2 | |
| APPLICATION NO. | : 13/341583 | |
| DATED | : January 7, 2014 | |
| INVENTOR(S) | : Jesse R. Boyer et al. | |

It is certified that error appears in the above-identified patent and that said Letters Patent is hereby corrected as shown below:

In the Specification

Col. 7, Line 2
Delete "264"
Insert --26-I--

Signed and Sealed this
Fourth Day of March, 2014

Michelle K. Lee
*Deputy Director of the United States Patent and Trademark Office*